(12) United States Patent
Zhang et al.

(10) Patent No.: US 11,570,069 B2
(45) Date of Patent: Jan. 31, 2023

(54) NETWORK TRAFFIC CLASSIFICATION METHOD AND SYSTEM BASED ON IMPROVED K-MEANS ALGORITHM

(71) Applicant: NANJING UNIVERSITY OF POSTS AND TELECOMMUNICATIONS, Nanjing (CN)

(72) Inventors: Dengyin Zhang, Nanjing (CN); Yue Cai, Nanjing (CN); Yi Xiao, Nanjing (CN); Shasha Zhao, Nanjing (CN)

(73) Assignee: NANJING UNIVERSITY OF POSTS AND TELECOMMUNICATINS, Nanjing (CN)

( * ) Notice: Subject to any disclaimer, the term of this patent is extended or adjusted under 35 U.S.C. 154(b) by 0 days.

(21) Appl. No.: 17/846,908

(22) Filed: Jun. 22, 2022

(65) Prior Publication Data

US 2022/0329504 A1 Oct. 13, 2022

Related U.S. Application Data

(63) Continuation of application No. PCT/CN2021/095793, filed on May 25, 2021.

(30) Foreign Application Priority Data

Jun. 22, 2020 (CN) .......................... 202010572022.0

(51) Int. Cl.
*H04L 43/062* (2022.01)
*G06K 9/62* (2022.01)
(Continued)

(52) U.S. Cl.
CPC .......... *H04L 43/062* (2013.01); *G06K 9/6223* (2013.01); *H04L 43/0811* (2013.01); *H04L 43/0882* (2013.01); *H04L 43/0888* (2013.01)

(58) Field of Classification Search
CPC ............... H04L 43/062; H04L 43/0811; H04L 43/0882; H04L 43/0888; G06K 9/6223
See application file for complete search history.

(56) References Cited

U.S. PATENT DOCUMENTS 8,676,729 B1 * 3/2014 Keralapura ......... H04L 63/1416
706/12
8,694,630 B1 * 4/2014 Keralapura ......... H04L 47/2441
709/224

(Continued)

FOREIGN PATENT DOCUMENTS

CN 110009005 A 7/2019
CN 110365603 A 10/2019
(Continued)

OTHER PUBLICATIONS

Internation Search Report of PCT/CN2021/095793, dated Jul. 15, 2021.

*Primary Examiner* — Jerry B Dennison

(57) ABSTRACT

Disclosed are a network traffic classification method and system based on an improved K-means algorithm. The method comprises: judging whether a total number NIC of network traffic data points in an initial clustering center set reaches an expected number k of network traffic clusters, if the k is not reached, calculating candidate metric values of network traffic data points in a high-density network traffic data point set, selecting a network traffic data point having the maximum candidate metric value, adding same into an initial clustering center set, removing the network traffic data point from the high-density network traffic data point set, then repeating the step until the total number NIC of network traffic data points in the initial clustering center set reaches the k, and ending the step. The method and system can ensure high network traffic classification accuracy.

15 Claims, 2 Drawing Sheets

(51) Int. Cl.
*H04L 43/0811* (2022.01)
*H04L 43/0882* (2022.01)
*H04L 43/0888* (2022.01)

(56) References Cited

U.S. PATENT DOCUMENTS 9,686,173 B1 * 6/2017 Giordano ............ H04L 43/0864
9,729,571 B1 * 8/2017 Ferguson ............ H04L 63/1408

FOREIGN PATENT DOCUMENTS

| CN | 111211994 A | 5/2020 |
| CN | 111740921 A | 10/2020 |
| WO | 2015060849 A1 | 4/2015 |

* cited by examiner

NETWORK TRAFFIC CLASSIFICATION METHOD AND SYSTEM BASED ON IMPROVED K-MEANS ALGORITHM

CROSS-REFERENCE TO RELATED APPLICATIONS

This application is a continuation of International Patent Application No. PCT/CN2021/095793 with a filing date of May 25, 2021, designating the United States, now pending, and further claims priority to Chinese Patent Application No. 202010572022.0 with a filing date of Jun. 22, 2020. The content of the aforementioned applications, including any intervening amendments thereto, are incorporated herein by reference.

TECHNICAL FIELD

The present invention relates to a network traffic classification method and system based on an improved K-means algorithm, and belongs to the technical field of network traffic classification.

BACKGROUND

Network traffic classification technology is one of the basic means to analyze network traffic characteristics and enhance network controllability. Early network traffic classification methods are mainly based on ports, but as the complexity of data in the network increases, many protocols no longer follow such rules, and a lot of p2p software has the characteristics of randomness and concurrency in the use of ports, and most of such software uses multiple ports at the same time. In addition, some applications will deliberately disguise ports, for example, using DNS tunnels can bypass ACLs or traffic auditing, so the port-based network traffic classification is no longer reliable.

There is also a network traffic classification method based on packet characteristic identification, some of which only correspond to one application, so that the packets can be distinguished by identifying the characteristic identification. This method is simple and has high accuracy. However, once the protocol is changed, this method has to readjust the characteristic identification, so that the response to the protocol change is not rapid enough. In addition, the recognition of the characteristic identification depends on human labor to a great extent, which will cost a lot of manpower and time.

SUMMARY

The object of the present invention is to overcome the shortcomings in the prior art, and provide a network traffic classification method and system based on an improved K-means algorithm, which can ensure higher network traffic classification accuracy.

To achieve the above object, the present invention employs the following technical solutions.

In a first aspect, the present invention provides a network traffic classification method based on an improved K-means algorithm. The method comprises the following steps of:

step 1: defining a number of network traffic data points as N;

defining a Euclidean distance between a network traffic data point which is $n^{th}$ closest to an $i^{th}$ network traffic data point and the $i^{th}$ network traffic data point as an $n^{th}$ distance of the $i^{th}$ network traffic data point, wherein i=1, 2, 3, ..., N;

defining a distribution density of all network traffic data points from the closest to the $n^{th}$ closest to the $i^{th}$ network traffic data point in a multi-dimensional hypersphere with the $i^{th}$ network traffic data point as a spherical center and the $n^{th}$ distance of the $i^{th}$ network traffic data point as a radius r as an $n^{th}$ density $D_{in}$ of the $i^{th}$ network traffic data point, wherein one and only one network traffic data point which is closest to the $i^{th}$ network traffic data point and one and only one network traffic data point which is $n^{th}$ closest to the $i^{th}$ network traffic data point are provided respectively, and all network traffic data points comprise the network traffic data point closest to the $i^{th}$ network traffic data point and the network traffic data point $n^{th}$ closest to the $i^{th}$ network traffic data point;

inputting a network traffic data point set to be clustered and an expected number k of network traffic clusters;

determining a specific value of n in the $n^{th}$ distance of the $i^{th}$ network traffic data point;

calculating an average value avg of $n^{th}$ densities of all network traffic data points;

adding the network traffic data points in all network traffic data points with the $n^{th}$ density greater than avg into a high-density network traffic data point set; and selecting a network traffic data point having the maximum $n^{th}$ density in the high-density network traffic data point set, adding same into an initial cluster center set, and removing the network traffic data point from the high-density network traffic data point set; and step 2: determining whether a total number NIC of network traffic data points in the initial clustering center set reaches the expected number k of network traffic clusters, if the k is not reached, calculating candidate metric values of the network traffic data points in the high-density network traffic data point set, selecting a network traffic data point having the maximum candidate metric value, adding same into the initial clustering center set, removing the network traffic data point from the high-density network traffic data point set, then repeating step 2 until the total number NIC of network traffic data points in the initial clustering center set reaches the k, and ending step 2.

With reference to the first aspect, further, a calculation formula of the $n^{th}$ density $D_{in}$ of the $i^{th}$ network traffic data point is that $$D_{in} = \frac{n - 0.5}{r + 1}.$$

With reference to the first aspect, further, a calculation formula of n in the $n^{th}$ distance of the $i^{th}$ network traffic data point is that $$n = \frac{N}{k \times 8}.$$

With reference to the first aspect, further, a calculation formula of the average value avg of the $n^{th}$ densities of all network traffic data points is that $$n = \frac{N}{k \times 8}.$$

The With reference to the first aspect, further, a candidate metric value of a $j^{th}$ network traffic data point in the high-density network traffic data point set is recorded as $cd_j$, and a calculation formula thereof is that $cd_j=\min(<A_j, ic_1>, <A_j, ic_2>, \ldots, <A_j, ic_{NIC}>)$, wherein, $A_j$ is the $j^{th}$ network traffic data point in the high-density network traffic data point set, $j=1, 2, 3, \ldots$, NHD, and NHD is a total number of network traffic data points in the high-density network traffic data point set, $ic1$, $ic2, \ldots, ic_{NIC}$ are respectively first, second, $\ldots$, $NIC^{th}$ network traffic data points in the initial clustering center set, $<A_j, ic_1>$ is a Euclidean distance between the $j^{th}$ network traffic data point in the high-density network traffic data point set and the first network traffic data point in the initial clustering center set, and so on, $<A_j, ic_{NIC}>$ is a Euclidean distance between the $j^{th}$ network traffic data point in the high-density network traffic data point set and the $NIC^{th}$ network traffic data point in the initial clustering center set.

In a second aspect, the present invention provides a network traffic classification system based on an improved K-means algorithm. The system comprises:

a first definition module: configured for defining a number of network traffic data points as N;

a second definition module: configured for defining a Euclidean distance between a network traffic data point which is $n^{th}$ closest to an $i^{th}$ network traffic data point and the $i^{th}$ network traffic data point as an $n^{th}$ distance of the $i^{th}$ network traffic data point, wherein $i=1, 2, 3, \ldots, N$;

a third definition module: configured for defining a distribution density of all network traffic data points from the closest to the $n^{th}$ closest to the $i^{th}$ network traffic data point in a multi-dimensional hypersphere with the $i^{th}$ network traffic data point as a spherical center and the $n^{th}$ distance of the $i^{th}$ network traffic data point as a radius r as an $n^{th}$ density $D_{in}$ of the $i^{th}$ network traffic data point, wherein one and only one network traffic data point which is closest to the $i^{th}$ network traffic data point and one and only one network traffic data point which is $n^{th}$ closest to the $i^{th}$ network traffic data point are provided respectively, and all network traffic data points comprise the network traffic data point closest to the $i^{th}$ network traffic data point and the network traffic data point $n^{th}$ closest to the $i^{th}$ network traffic data point;

an input module: configured for inputting a network traffic data point set to be clustered and an expected number k of network traffic clusters;

an n value determining module: configured for determining a specific value of n in the $n^{th}$ distance of the $i^{th}$ network traffic data point;

an average value calculating module: configured for calculating an average value avg of $n^{th}$ densities of all network traffic data points;

a first adding module: configured for adding the network traffic data points in all network traffic data points with the $n^{th}$ density greater than avg into a high-density network traffic data point set;

a second adding module: configured for selecting a network traffic data point having the maximum $n^{th}$ density in the high-density network traffic data point set, adding same into an initial cluster center set, and removing the network traffic data point from the high-density network traffic data point set; and a judging module: configured for judging whether a total number NIC of network traffic data points in the initial clustering center set reaches the expected number k of network traffic clusters, if the k is not reached, calculating candidate metric values of the network traffic data points in the high-density network traffic data point set, selecting a network traffic data point having the maximum candidate metric value, adding same into the initial clustering center set, removing the network traffic data point from the high-density network traffic data point set, then repeating the tasks performed by the judging module until the total number NIC of network traffic data points in the initial clustering center set reaches the k, and ending the tasks performed by the judging module.

In a third aspect, the present invention provides a network traffic classification system based on an improved K-means algorithm, comprising a processor and a storage medium, wherein:

the storage medium is configured for storage instructions; and the processor is configured for operating according to the instructions to perform the steps of any one of the aforementioned methods.

In a fourth aspect, the present invention provides a non-transitory computer-readable storage medium storing a computer program thereon, wherein the program, when executed by a processor, performs the steps of any one of the aforementioned methods.

Compared with the prior art, the present invention has the beneficial effects as follows.

Based on the improved K-means algorithm, the distribution of the network traffic data points is fully considered, and the method of randomly generating the initial clustering centers is abandoned, so that a better initial clustering center is obtained and used for clustering, such that the training efficiency is improved, and the higher network traffic classification accuracy can be ensured.

DETAILED DESCRIPTION

Figure 1:
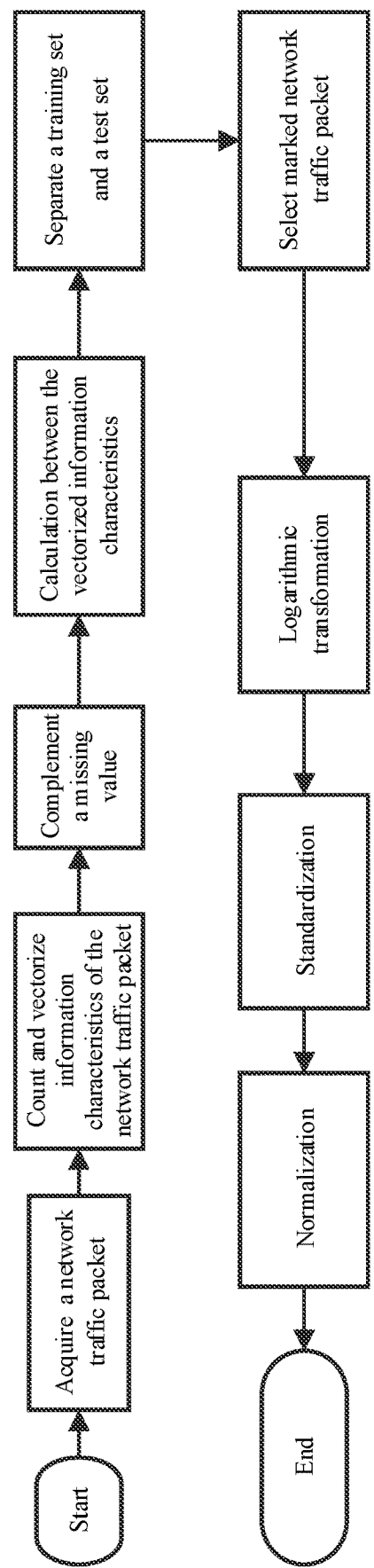
FIG. 1 is a flowchart of preparation work before selecting an initial clustering center according to the embodiments of the present invention.

The present invention is further described hereinafter with reference to the drawings. The following embodiments are only used to illustrate the technical solutions of the present invention more clearly, but not to limit the scope of protection of the present invention.

The embodiments of the present invention provide a network traffic classification method based on an improved K-means algorithm. The method comprises the following steps.

At step 1, a network traffic packet is acquired.

At step 2, information characteristics of the network traffic packet are counted, comprising a packet size, a packet control byte length and a stream duration, and these information characteristics are vectorized.

At step 3, a missing value of the data in the vectorized network traffic packet is supplemented. In this embodiment, a strategy of mean filling is adopted.

At step 4, through calculation, three additional new characteristic information characteristics are obtained, which are as follows: using a proportional value of C/S and S/C packets obtained by dividing a number of C/S packets by a number of S/C packets as the first new characteristic; using a total number of bytes in bidirectional transmission obtained by adding a total number of S/C bytes to a total number of C/S bytes as the second new characteristic; and using an average control byte ratio obtained by dividing an average control byte number of packets by an average byte number of packets is used as the third new characteristic.

At step 5, a training set and a test set are separated. In this embodiment, the training set refers to a network traffic packet set which is delivered to the improved K-means algorithm and clustered, and then a classification model is obtained through the training set; the test set refers to a network traffic packet set that divides network traffic packets in the set into different network application types according to the clustering result (that is, the classification model obtained by clustering), and counts a correct rate of the division to evaluate performances of the classification model; a union of the test set and the training set is the whole network traffic packet set, i.e. a complete set, with the test set accounting for 20% of the complete set and the training set accounting for 80% of the complete set.

At step 6, marked network traffic packet are selected; as this embodiment is based on unsupervised learning, all network traffic packets are considered to be unmarked, but if all network traffic packets are unmarked, a mapping relation between a cluster and an actual application type cannot be established after clustering, so some network traffic packets need to be randomly considered to be marked; in this way, a maximum likelihood method may be used to correspond the cluster to the actual application type and be more in line with the actual situation; therefore, it is necessary to identify the marked network traffic packets in the embodiment of the present invention only for a large number of unmarked network traffic packets and a small number of marked network traffic packets.

At step 7, preprocessing of data transformation is carried out on the data in the vectorized network traffic packet, and the processing method is to adopt a logarithmic transformation method first, then adopt a standardization method and finally adopt a normalization method; in this embodiment, the specific step of adopting the logarithmic transformation method is to record data to be transformed as x, and transformation results as x', and perform logarithmic transformation by using a logarithmic transformation formula that x'=ln(x+1), so that the distribution of information characteristics of the network traffic packet tends to normal distribution, thus improving the identification accuracy of the improved K-means algorithm on the unmarked network traffic packets.

As shown in FIG. 1, step 1 to step 7 are a flowchart of preparation work before selecting an initial clustering center.

At step 8, the initial clustering center is selected based on the improved K-means algorithm to abstract the network traffic packet as the network traffic data point, wherein the specific steps are as follows:

At step (8.1), a number of network traffic data points is defined as N.

At step (8.2), a Euclidean distance between a network traffic data point which is $n^{th}$ closest to an $i^{th}$ network traffic data point and the $i^{th}$ network traffic data point is defined as an $n^{th}$ distance of the $i^{th}$ network traffic data point, wherein i=1, 2, 3, . . . , N.

At step (8.3), a distribution density of all network traffic data points from the closest to the $n^{th}$ closest to the $i^{th}$ network traffic data point (all network traffic data points comprise a network traffic data point which is closest to the $i^{th}$ network traffic data point and a network traffic data point which is $n^{th}$ closest to the $i^{th}$ network traffic data point) in a multi-dimensional hypersphere with the $i^{th}$ network traffic data point is defined as a spherical center and the $n^{th}$ distance of the $i^{th}$ network traffic data point as a radius r as an $n^{th}$ density $D_{in}$ of the $i^{th}$ network traffic data point, wherein $$D_{in} = \frac{n - 0.5}{r + 1},$$

and one and only one network traffic data point which is closest to the $i^{th}$ network traffic data point and one and only one network traffic data point which is $n^{th}$ closest to the $i^{th}$ network traffic data point are provided respectively.

As the multi-dimensional hypersphere contains (n−1) points, and the network traffic data point which is $n^{th}$ closest to the $i^{th}$ network traffic data point is located on a spherical shell of the multi-dimensional hypersphere, which may be counted as 0.5 point, a numerator of the $D_{in}$ calculation formula is (n−1+0.5, i.e., n−0.5); in order to avoid the problem of insufficient calculation accuracy caused by too small $n^{th}$ distance of the $i^{th}$ network traffic data point, a denominator of the $D_{in}$ calculation formula is radius r+1 of the multi-dimensional hypersphere.

At step (8.4), a network traffic data point set to be clustered and an expected number k of network traffic clusters are input.

At step (8.5), a specific value of n in the $n^{th}$ distance of the $i^{th}$ network traffic data point is determined, wherein $$n = \frac{N}{k \times 8},$$

the specific value of n is related to the number k of network traffic clusters, n is ⅛ of an average numerical value of clusters N/k, which is the optimum solution obtained in this embodiment by experiment.

At step (8.6), an average value avg of $n^{th}$ densities of all network traffic data points is calculated, wherein $$avg = \frac{1}{N} \sum_{i=1}^{N} D_{in}.$$

At step (8.7), the network traffic data points in all network traffic data points with the $n^{th}$ density greater than avg are added into a high-density network traffic data point set.

At step (8.8), a network traffic data point having the maximum $n^{th}$ density in the high-density network traffic data point set is selected and added into an initial cluster center set, and the network traffic data point is removed from the high-density network traffic data point set.

At step (8.9), it is determined whether a total number NIC of network traffic data points in the initial clustering center set reaches the expected number k of network traffic clusters, if the k is not reached, candidate metric values of the network traffic data points in the high-density network traffic data point set are calculated, a network traffic data point having the maximum candidate metric value is selected, and added into the initial clustering center set, the network traffic data point is removed from the high-density network traffic data point set, then step (8.9) is repeated until the total number NIC of network traffic data points in the initial clustering center set reaches the k, and step (8.9) is ended, thus obtaining the initial clustering center, wherein, a candidate metric value of a $j^{th}$ network traffic data point in the high-density network traffic data point set is recorded as $cd_j$, and a calculation formula thereof is that $cd_j=\min(<A_j, ic_1>, <A_j, ic_2>, \ldots, <A_j, ic_{NIC}>)$, while $A_j$ is the $j^{th}$ network traffic data point in the high-density network traffic data point set, $j=1, 2, 3, \ldots$, NHD, and NHD is a total number of network traffic data points in the high-density network traffic data point set, $ic_1, ic_2, \ldots, ic_{NIC}$ are respectively first, second, $\ldots$, $NIC^{th}$ network traffic data points in the initial clustering center set, $<A_j, ic_1>$ is a Euclidean distance between the $j^{th}$ network traffic data point in the high-density network traffic data point set and the first network traffic data point in the initial clustering center set, and so on, $<A_j, ic_{NIC}>$ is a Euclidean distance between the $j^{th}$ network traffic data point in the high-density network traffic data point set and the $NIC^{th}$ network traffic data point in the initial clustering center set.

At step 9, the initial clustering center obtained in step (8.9) is used for clustering.

At step 10, a maximum likelihood method is used to establish a mapping relation between the network traffic cluster obtained by clustering and a network application type. The specific steps are as follows:

let $C=\{C_1, C_2, \ldots, C_k\}$ be the network traffic cluster set obtained by clustering, k be the total number of network traffic clusters obtained by clustering, let $R=\{R_1, R_2, \ldots, R_l\}$ be a network application type set of network traffics, and l be a total number of network application types, wherein l≤k, let a mapping between the network traffic clusters $C_i$ obtained by clustering and the network application types $R_j$ be f:C→R, then the maximum likelihood method is used to define a probability model of the mapping f as:

$$P(R_j \mid C_i) = \frac{n_{ji}}{N_i}, 1 \le j \le l, 1 \le i \le k;$$

wherein, $n_{ji}$ is a number of network traffic data points marked as the network application type $R_j$ in the network traffic cluster $C_i$, and $N_i$ is a total number of all marked network traffic data points in the network traffic cluster $C_i$;

$R_t$ is recorded as the finally recognized network application type corresponding to the network traffic cluster $C_i$, then $R_t$ needs to satisfy the following conditions:

$$P(R_t|C_i)=\max[P(R_1|C_i),P(R_2|C_i), \ldots ,P(R_l|C_i)].$$

If no marked network traffic data points exist in on network traffic cluster, then the network traffic cluster is identified as an unknown network application type. In this embodiment, the calculation of $P(R_j|C_i)$ is simplified. If the network traffic data points of a network application type among the marked network traffic data points in the network traffic cluster are the most, the network traffic cluster is identified as the network application type. Therefore, there are often multiple network traffic clusters mapped to the same network application type, and this does not necessarily mean that the network traffic cluster corresponds to the application type one by one.

Figure 2:
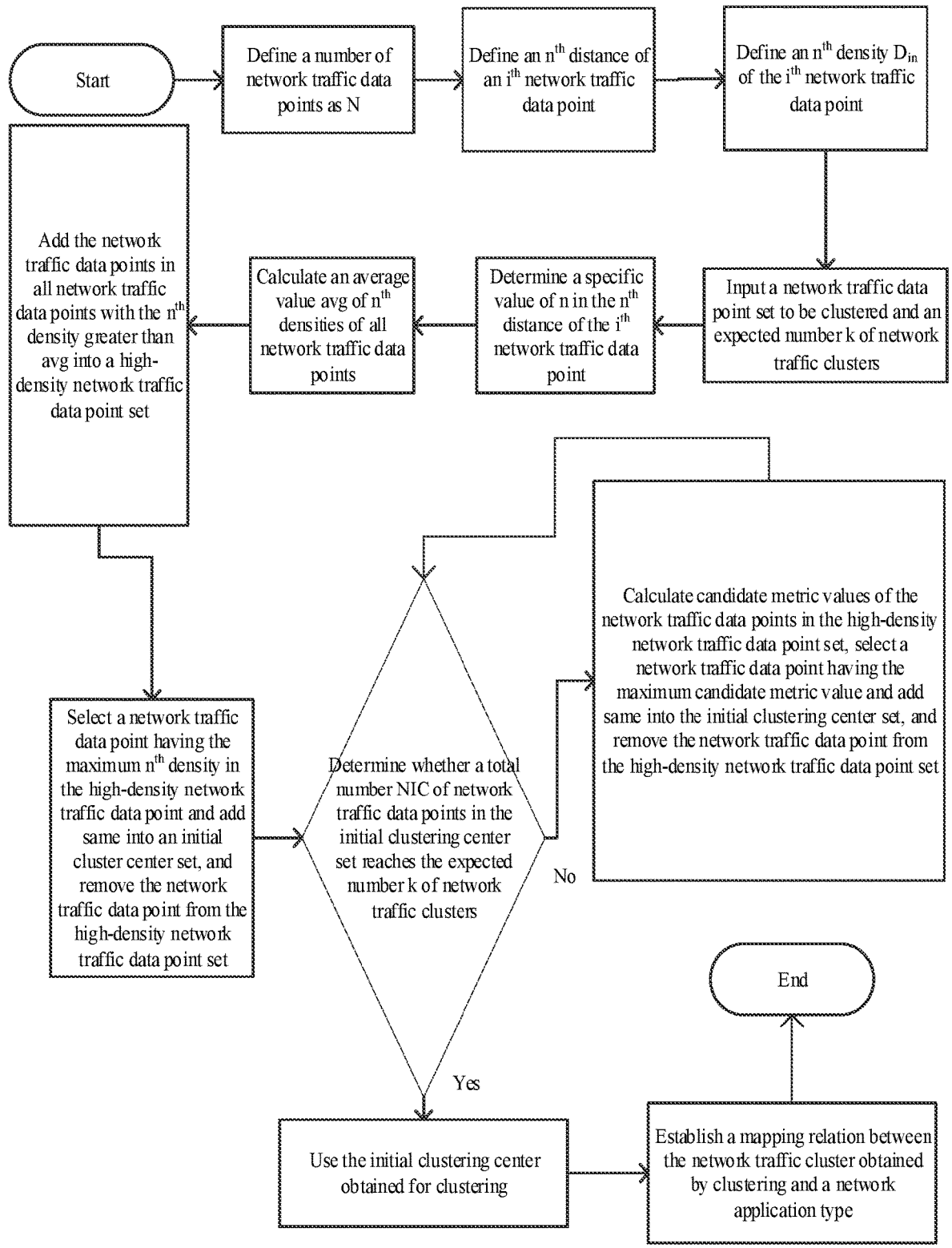
FIG. 2 is a specific flowchart of selecting the initial clustering center and clustering, and establishing a mapping relation between a network traffic cluster and a network application type obtained by clustering according to the embodiments of the present invention.

As shown in FIG. 2, step 3 to step 10 are a specific flowchart of selecting the initial clustering center and clustering, and establishing the mapping relation between the network traffic cluster and the network application type obtained by clustering.

Based on the improved K-means algorithm, the distribution of the network traffic data points is fully considered, and the method of randomly generating the initial clustering centers is abandoned, so that a better initial clustering center is obtained and used for clustering, such that the training efficiency is improved, and the higher network traffic classification accuracy can be ensured.

The embodiments of the present invention provide a network traffic classification system based on an improved K-means algorithm, comprising:

a first definition module: configured for defining a number of network traffic data points as N;

a second definition module: configured for defining a Euclidean distance between a network traffic data point which is $n^{th}$ closest to an $i^{th}$ network traffic data point and the $i^{th}$ network traffic data point as an $n^{th}$ distance of the $i^{th}$ network traffic data point, wherein i=1, 2, 3, . . . , N;

a third definition module: configured for defining a distribution density of all network traffic data points from the closest to the $n^{th}$ closest to the $i^{th}$ network traffic data point in a multi-dimensional hypersphere with the $i^{th}$ network traffic data point as a spherical center and the $n^{th}$ distance of the $i^{th}$ network traffic data point as a radius r as an $n^{th}$ density $D_{in}$ of the $i^{th}$ network traffic data point, wherein one and only one network traffic data point which is closest to the $i^{th}$ network traffic data point and one and only one network traffic data point which is $n^{th}$ closest to the $i^{th}$ network traffic data point are provided respectively, and all network traffic data points comprise the network traffic data point closest to the $i^{th}$ network traffic data point and the network traffic data point $n^{th}$ closest to the $i^{th}$ network traffic data point;

an input module: configured for inputting a network traffic data point set to be clustered and an expected number k of network traffic clusters;

an n value determining module: configured for determining a specific value of n in the $n^{th}$ distance of the $i^{th}$ network traffic data point;

an average value calculating module: configured for calculating an average value avg of $n^{th}$ densities of all network traffic data points;

a first adding module: configured for adding the network traffic data points in all network traffic data points with the $n^{th}$ density greater than avg into a high-density network traffic data point set;

a second adding module: configured for selecting a network traffic data point having the maximum $n^{th}$ density in the high-density network traffic data point set, adding same into an initial cluster center set, and removing the network traffic data point from the high-density network traffic data point set; and a judging module: configured for judging whether a total number NIC of network traffic data points in the initial clustering center set reaches the expected number k of network traffic clusters, if the k is not reached, calculating candidate metric values of the network traffic data points in the high-density network traffic data point set, selecting a network traffic data point having the maximum candidate metric value, adding same into the initial clustering center set, removing the network traffic data point from the high-density network traffic data point set, then repeating the tasks performed by the judging module until the total number NIC of network traffic data points in the initial clustering center set reaches the k, and ending the tasks performed by the judging module.

The embodiments of the present invention also provide a network traffic classification system based on an improved K-means algorithm, comprising a processor and a storage medium, wherein:

the storage medium is configured for storage instructions; and the processor is configured for operating according to the instructions to perform the steps of the aforementioned methods.

The embodiments of the present disclosure further provide a non-transitory computer-readable storage medium storing a computer program thereon, wherein the computer program, when executed by a processor, performs the steps of the aforementioned methods.

It should be appreciated by those skilled in this art that the embodiment of the present application may be provided as methods, systems or computer program products. Therefore, the embodiments of the present application may take the form of complete hardware embodiments, complete software embodiments or software-hardware combined embodiments. Moreover, the embodiments of the present application may take the form of a computer program product embodied on one or more computer usable storage media (including but not limited to disk storage, CD-ROM, optical storage, etc.) in which computer usable program codes are included.

The present application is described with reference to the flow charts and/or block diagrams of the method, apparatus (system), and computer program products according to the embodiments of the present disclosure. It should be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable data processing apparatus to produce a machine for the instructions executed by the computer or the processor of other programmable data processing apparatus to generate a system for implementing the functions specified in one or more flows of the flow chart and/or in one or more blocks of the block diagram.

These computer program instructions may also be provided to a computer readable memory that can guide the computer or other programmable data processing apparatus to work in a given manner, so that the instructions stored in the computer readable memory generate a product including an instruction system that implements the functions specified in one or more flows of the flow chart and/or in one or more blocks of the block diagram.

These computer program instructions may also be loaded to a computer, or other programmable data processing apparatus, so that a series of operating steps are executed on the computer, or other programmable data processing apparatus to produce processing implemented by the computer, so that the instructions executed in the computer or other programmable data processing apparatus provide steps for implementing the functions specified in one or more flows of the flow chart and/or in one or more blocks of the block diagram.

The descriptions above are merely preferred embodiments of the present invention, and it should be noted that those of ordinary skills in the art may make a plurality of improvements and deformations without departing from the technical principle of the present invention, and these improvements and deformations shall also fall within the scope of protection of the present invention.

The invention claimed is:

1. A network traffic classification method based on an improved K-means algorithm, comprising the following steps of:

defining a number of network traffic data points as N;

defining a Euclidean distance between a network traffic data point which is $n^{th}$ closest to an $i^{th}$ network traffic data point and the $i^{th}$ network traffic data point as an $n^{th}$ distance of the $i^{th}$ network traffic data point, wherein i=1, 2, 3, . . . , N;

defining a distribution density of all network traffic data points from the closest to the $n^{th}$ closest to the $i^{th}$ network traffic data point in a multi-dimensional hypersphere with the $i^{th}$ network traffic data point as a spherical center and the $n^{th}$ distance of the $i^{th}$ network traffic data point as a radius r as an $n^{th}$ density $D_{in}$ of the $i^{th}$ network traffic data point, wherein one and only one network traffic data point which is closest to the $i^{th}$ network traffic data point and one and only one network traffic data point which is $n^{th}$ closest to the $i^{th}$ network traffic data point are provided respectively, and all network traffic data points comprise the network traffic data point closest to the $i^{th}$ network traffic data point and the network traffic data point $n^{th}$ closest to the $i^{th}$ network traffic data point;

inputting a network traffic data point set to be clustered and an expected number k of network traffic clusters;

determining a specific value of n in the $n^{th}$ distance of the $i^{th}$ network traffic data point;

calculating an average value avg of $n^{th}$ densities of all network traffic data points;

adding the network traffic data points in all network traffic data points with the $n^{th}$ density greater than the average value avg of the $n^{th}$ densities into a high-density network traffic data point set, wherein the high-density is greater than the average value avg of the $n^{th}$ densities; and selecting network traffic data points having the maximum $n^{th}$ density in the high-density network traffic data point set, adding the network traffic data points having the maximum $n^{th}$ density into an initial cluster center set, and removing the network traffic data points from the high-density network traffic data point set until a total number NIC of network traffic data points in the initial cluster center set reaches the expected number k of network traffic clusters;

clustering the initial cluster center set;

establishing a mapping relation between a network traffic cluster obtained by the clustering and a network application type; and classifying the network traffic data point based on the mapping relation.

2. The network traffic classification method based on the improved K-means algorithm according to claim 1, wherein a calculation formula of the $n^{th}$ density $D_{in}$ of the $i^{th}$ network traffic data point is that $$D_{in} = \frac{n-0.5}{r+1}.$$

3. The network traffic classification method based on the improved K-means algorithm according to claim 1, wherein a calculation formula of n in the $n^{th}$ distance of the $i^{th}$ network traffic data point is that $$n = \frac{N}{k \times 8}.$$

4. The network traffic classification method based on the improved K-means algorithm according to claim 2, wherein a calculation formula of the average value avg of the $n^{th}$ densities of all network traffic data points is that $$avg = \frac{1}{N}\sum_{i=1}^{N}D_{in}.$$

5. The network traffic classification method based on the improved K-means algorithm according to claim 1, wherein a candidate metric value of a $j^{th}$ network traffic data point in the high-density network traffic data point set is recorded as $cd_j$, and a calculation formula thereof is that $cd_j=\min(<A_j, ic_1>, <A_j, ic_2>, \ldots, <A_j, ic_{NIC}>)$, wherein, $A_j$ is the $j^{th}$ network traffic data point in the high-density network traffic data point set, j=1, 2, 3, ..., NHD, and NHD is a total number of network traffic data points in the high-density network traffic data point set, $ic_1, ic_2, \ldots, ic_{NIC}$ are respectively first, second, ..., $NIC^{th}$ network traffic data points in the initial cluster center set, $<A_j, ic_1>$ is a Euclidean distance between the $j^{th}$ network traffic data point in the high-density network traffic data point set and the first network traffic data point in the initial cluster center set, and so on, $<A_j, ic_{NIC}>$ is a Euclidean distance between the $j^{th}$ network traffic data point in the high-density network traffic data point set and the $NIC^{th}$ network traffic data point in the initial cluster center set.

6. A network traffic classification system based on an improved K-means algorithm, comprising a processor and a storage medium, wherein:

the storage medium is configured for storage instructions; and the processor is configured for operating according to the instructions to perform a network traffic classification method based on an improved K-means algorithm, the method comprising the following steps of:

defining a number of network traffic data points as N;

defining a Euclidean distance between a network traffic data point which is $n^{th}$ closest to an $i^{th}$ network traffic data point and the $i^{th}$ network traffic data point as an $n^{th}$ distance of the $i^{th}$ network traffic data point, wherein i=1, 2, 3, ..., N;

defining a distribution density of all network traffic data points from the closest to the $n^{th}$ closest to the $i^{th}$ network traffic data point in a multi-dimensional hypersphere with the $i^{th}$ network traffic data point as a spherical center and the $n^{th}$ distance of the $i^{th}$ network traffic data point as a radius r as an $n^{th}$ density $D_{in}$ of the $i^{th}$ network traffic data point, wherein one and only one network traffic data point which is closest to the $i^{th}$ network traffic data point and one and only one network traffic data point which is $n^{th}$ closest to the $i^{th}$ network traffic data point are provided respectively, and all network traffic data points comprise the network traffic data point closest to the $i^{th}$ network traffic data point and the network traffic data point $n^{th}$ closest to the $i^{th}$ network traffic data point;

inputting a network traffic data point set to be clustered and an expected number k of network traffic clusters;

determining a specific value of n in the $n^{th}$ distance of the $i^{th}$ network traffic data point;

calculating an average value avg of $n^{th}$ densities of all network traffic data points;

adding the network traffic data points in all network traffic data points with the $n^{th}$ density greater than the average value avg of the $n^{th}$ densities into a high-density network traffic data point set, wherein the high-density is greater than the average value avg of the $n^{th}$ densities; and selecting network traffic data points having the maximum $n^{th}$ density in the high-density network traffic data point set, adding the network traffic data points having the maximum $n^{th}$ density into an initial cluster center set, and removing the network traffic data points from the high-density network traffic data point set until a total number NIC of network traffic data points in the initial cluster center set reaches the expected number k of network traffic clusters;

clustering the initial cluster center set;

establishing a mapping relation between a network traffic cluster obtained by the clustering and a network application type; and classifying the network traffic data point based on the mapping relation.

7. The network traffic classification system based on the improved K-means algorithm according to claim 6, wherein a calculation formula of the $n^{th}$ density $D_{in}$ of the $i^{th}$ network traffic data point is that $$D_{in} = \frac{n - 0.5}{r + 1}.$$

8. The network traffic classification system based on the improved K-means algorithm according to claim 6, wherein a calculation formula of n in the $n^{th}$ distance of the $i^{th}$ network traffic data point is that $$n = \frac{N}{k \times 8}.$$

9. The network traffic classification system based on the improved K-means algorithm according to claim 7, wherein a calculation formula of the average value avg of the $n^{th}$ densities of all network traffic data points is that $$avg = \frac{1}{N}\sum_{i=1}^{N}D_{in}.$$

10. The network traffic classification system based on the improved K-means algorithm according to claim 6, wherein a candidate metric value of a $j^{th}$ network traffic data point in the high-density network traffic data point set is recorded as $cd_j$, and a calculation formula thereof is that $cd_j=\min(<A_j, ic_1>, <A_j, ic_2>, \ldots, <A_j, ic_{NIC}>)$, wherein, $A_j$ is the $j^{th}$ network traffic data point in the high-density network traffic data point set, j=1, 2, 3, ..., NHD, and NHD is a total number of network traffic data points in the high-density network traffic data point set, $ic_1, ic_2, \ldots, ic_{NIC}$ are respectively first, second, ..., $NIC^{th}$ network traffic data points in the initial cluster center set, $\langle A_j, ic_1\rangle$ is a Euclidean distance between the $j^{th}$ network traffic data point in the high-density network traffic data point set and the first network traffic data point in the initial cluster center set, and so on, $\langle A_j, ic_{NIC}\rangle$ is a Euclidean distance between the $j^{th}$ network traffic data point in the high-density network traffic data point set and the $NIC^{th}$ network traffic data point in the initial cluster center set.

11. A non-transitory computer-readable storage medium storing a computer program thereon, wherein the program, when executed by a processor, performs a network traffic classification method based on an improved K-means algorithm, the method comprising the following steps of:

defining a number of network traffic data points as N;

defining a Euclidean distance between a network traffic data point which is $n^{th}$ closest to an $i^{th}$ network traffic data point and the $i^f$ network traffic data point as an $n^{th}$ distance of the $i^{th}$ network traffic data point, wherein i=1, 2, 3, ..., N;

defining a distribution density of all network traffic data points from the closest to the $n^{th}$ closest to the $i^{th}$ network traffic data point in a multi-dimensional hyper-sphere with the $i^{th}$ network traffic data point as a spherical center and the $n^{th}$ distance of the $i^{th}$ network traffic data point as a radius r as an $n^{th}$ density $D_{in}$ of the $i^{th}$ network traffic data point, wherein one and only one network traffic data point which is closest to the $i^{th}$ network traffic data point and one and only one network traffic data point which is $n^{th}$ closest to the $i^{th}$ network traffic data point are provided respectively, and all network traffic data points comprise the network traffic data point closest to the $i^{th}$ network traffic data point and the network traffic data point $n^{th}$ closest to the $i^{th}$ network traffic data point;

inputting a network traffic data point set to be clustered and an expected number k of network traffic clusters;

determining a specific value of n in the $n^{th}$ distance of the $i^{th}$ network traffic data point;

calculating an average value avg of $n^{th}$ densities of all network traffic data points;

adding the network traffic data points in all network traffic data points with the $n^{th}$ density greater than the average value avg of the $n^{th}$ densities into a high-density network traffic data point set, wherein the high-density is greater than the average value avg of the $n^{th}$ densities; and selecting network traffic data points having the maximum $n^{th}$ density in the high-density network traffic data point set, adding the network traffic data points having the maximum $n^{th}$ density into an initial cluster center set, and removing the network traffic data points from the high-density network traffic data point set until a total number NIC of network traffic data points in the initial cluster center set reaches the expected number k of network traffic clusters;

clustering the initial cluster center set;

establishing a mapping relation between a network traffic cluster obtained by the clustering and a network application type; and classifying the network traffic data point based on the mapping relation.

12. The non-transitory computer-readable storage medium storing the computer program thereon according to claim 11, wherein a calculation formula of the $n^{th}$ density $D_{in}$ of the $i^{th}$ network traffic data point is that $$D_{in} = \frac{n - 0.5}{r + 1}.$$

13. The non-transitory computer-readable storage medium storing the computer program thereon according to claim 11, wherein a calculation formula of $n^{th}$ in the $n^{th}$ distance of the it network traffic data point is that $$n = \frac{N}{k \times 8}.$$

14. The non-transitory computer-readable storage medium storing the computer program thereon according to claim 12, wherein a calculation formula of the average value avg of the $n^{th}$ densities of all network traffic data points is that $$avg = \frac{1}{N}\sum_{i=1}^{N}D_{in}.$$

15. The non-transitory computer-readable storage medium storing the computer program thereon according to claim 11, wherein a candidate metric value of a $j^{th}$ network traffic data point in the high-density network traffic data point set is recorded as $cd_j$, and a calculation formula thereof is that $cd_j=\min(\langle A_j, ic_1\rangle, \langle A_j, ic_2\rangle, ..., \langle A_j, ic_{NIC}\rangle)$, wherein, $A_j$ is the $j^{th}$ network traffic data point in the high-density network traffic data point set, j=1, 2, 3, ..., NHD, and NHD is a total number of network traffic data points in the high-density network traffic data point set, $ic_1$, $ic_2$, ..., $ic_{NIC}$ are respectively first, second, ..., $NIC^{th}$ network traffic data points in the initial cluster center set, $\langle A_j, ic_1\rangle$ is a Euclidean distance between the $j^{th}$ network traffic data point in the high-density network traffic data point set and the first network traffic data point in the initial cluster center set, and so on, $\langle A_j, ic_{NIC}\rangle$ is a Euclidean distance between the $j^{th}$ network traffic data point in the high-density network traffic data point set and the $NIC^{th}$ network traffic data point in the initial cluster center set.

* * * * *